Oct. 26, 1948.  F. G. BORN  2,452,033
TRACTOR TRAILER BRAKE CONTROL
Filed April 16, 1945

INVENTOR
Frank G. Born
By Carlson, Pitzner, Hubbard & Wolfe
ATTORNEYS

Patented Oct. 26, 1948

2,452,033

UNITED STATES PATENT OFFICE 2,452,033

TRACTOR TRAILER BRAKE CONTROL

Frank G. Born, Beloit, Wis., assignor to Warner Electric Brake Manufacturing Company, South Beloit, Ill., a corporation of Illinois Application April 16, 1945, Serial No. 588,675

7 Claims. (Cl. 201—48)

This invention relates to a controller for governing the synchronized actuation of pressure actuated brakes on a pulling vehicle or tractor and electric trailer brakes in response to movement of a single actuator such as a foot pedal. The general object is to provide a novel controller of the above character which is simple in construction, durable and reliable in operation, and compact in the arrangement of its parts.

Another object is to provide such a controller having a novel mechanism for insuring deenergization of the trailer brakes under all circumstances when the tractor brakes are deenergized.

The invention also resides in the novel structural arrangement of the operating parts.

Other objects and advantages of the invention will become apparent from the following detailed description taken in connection with the accompanying drawings, in which Figure 1 is a diagrammatic view of the braking system on a tractor trailer vehicle.

Figure 1:
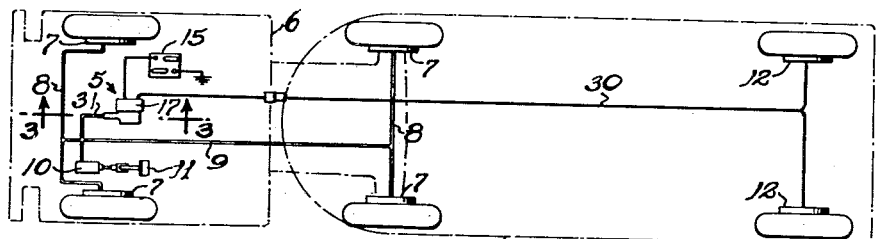

The improved controller indicated generally at 5 is intended to be mounted at some convenient point on the pulling vehicle 6 which may be a truck or passenger car and which is equipped with brakes 7 which are energized by pressure fluid forced through branch pipes 8 and a main supply pipe 9. The latter communicates with a pressure source which, in the hydraulic brake system shown by way of example, is a cylinder 10 having a piston therein moved by depression of the usual foot pedal 11 to apply pressure to the fluid in the entire system and thereby energize all of the brakes 7.

Figure 2:
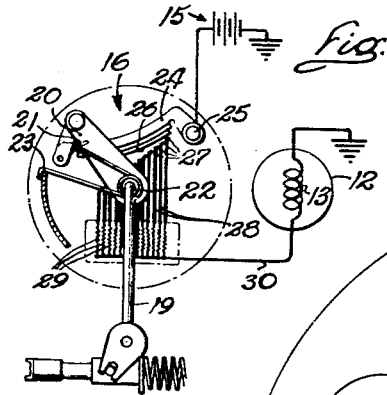
Fig. 2 is a side elevational view partially diagrammatic of the trailer brake control rheostat.
Figure 3:
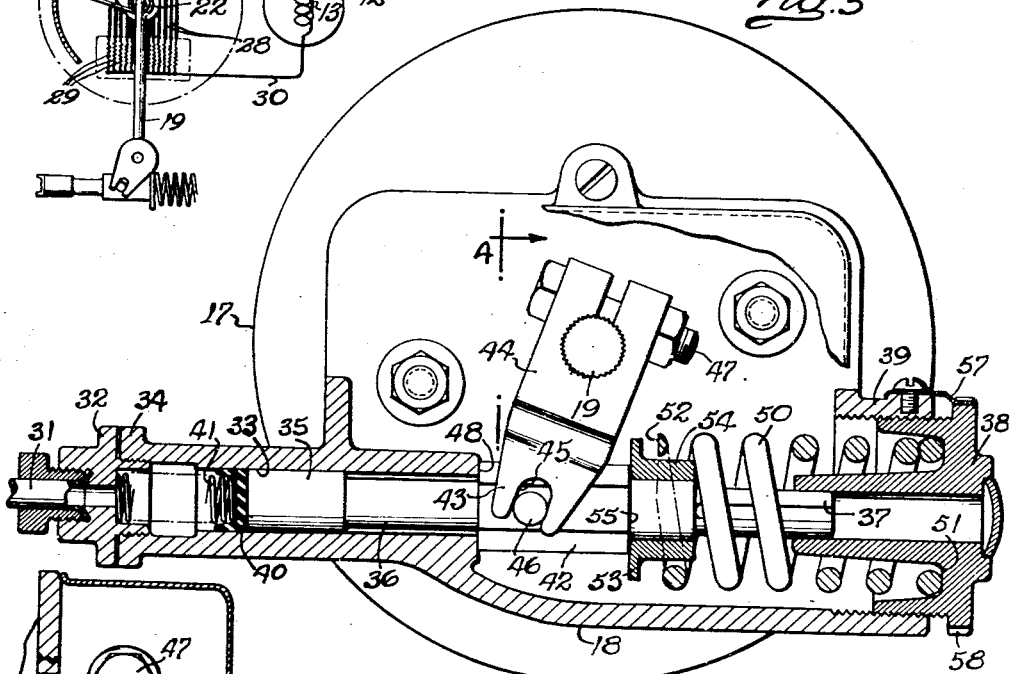
Fig. 3 is a sectional view of the brake controller taken along the line 3—3 in Fig. 1.
Figure 4:
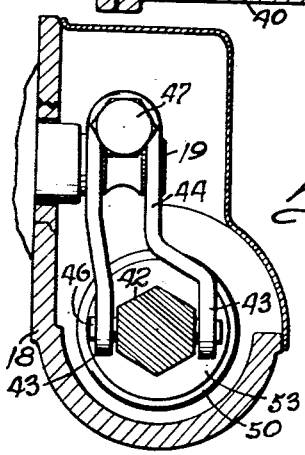
Fig. 4 is a fragmentary section taken along the line 4—4 of Fig. 3.

Brakes 12 which are actuated by the energization of individual magnetic windings 13 are provided on the wheels of the trailer 14. The application of electric current from the battery 15 and progressive variation of the energizing current are controlled in this instance by a rheostat 16 housed within a casing 17 which is secured to a casting 18 through which a shaft 19 for actuating the rheostat projects. In the rheostat shown, the shaft carries an arm 20 connected at 21 to one end portion of a relatively light torsion spring 22 coiled around the shaft 19 and anchored on the rheostat casing at 23 so as to urge the arm 20 and shaft toward the normal brake-released position shown in Figs. 2 and 3. The free end of the arm 20 is connected through a link to the free end of an arm 24 pivoted at 25 and carrying a contact plate 26 which is connected to the ungrounded terminal of the battery 15. This contact is curved so as to pick up and bend the ends 27 of spring contacts 28 cantilever mounted and respectively connected through resistance elements 29 having a common terminal leading through a conductor 30 to the ungrounded terminals of the brake windings 13. The first contact end 27 is picked up immediately upon movement of the contact plate 26 completing the circuit, and then as the additional contacts are engaged, other resistances are thrown in parallel successively to increase the energization of the trailer brakes progressively.

Branching from the main pressure fluid supply duct 9 is a pipe 31 connected through a fitting 32 to the head of a chamber 33 which is formed in a hollow projection 34 of the casting 18. For hydraulic brake systems, the chamber 33 is in the form of a cylinder and has a movable end wall formed by a piston slidable in the cylinder and formed on a rod 36 which projects from the other end of the cylinder transversely of and past the rheostat actuating shaft 19. The extreme opposite end 37 of the rod is guided in a plug 38 threading into a second projection 39 of the casting 18. To prevent fluid leakage past the piston 35, a synthetic rubber cup 40 fits snugly within the cylinder 33 ahead of the piston and is held pressed against the latter by a light compression spring 41.

Intermediate its ends the rod 35 is enlarged as indicated at 42 and is straddled by the bifurcated free ends 43 of an arm 44 having slots 45 therein which snugly receive a cross pin 46 on the enlargement 42. The other end of the arm is split and clamped by a bolt 47 to the projecting serrated end of the shaft 19. Thus, the piston 35 is positively connected to the shaft without lost motion, so that the rheostat contact plate 26 will move immediately and close the electric brake circuit in the initial counterclockwise motion of the shaft 19 from the brake-released position shown in Fig. 3. This position is defined by engagement of the forward end of the enlargement 42 with a shoulder 48 on the casting 18, the rod being held in this limit position by the rheostat spring 22 when the pressure in the cylinder 33 is released. It will be observed that the actuating arm 44 is inclined away from a perpendicular to the rod 35 when in the brake-released position so as to provide a substantial range of travel for the connected parts.

A heavy scale spring 50 is provided for resisting the motion of the piston 36 so as to cause a building up of pressure for actuating the hydraulic tractor brakes 7 in response to depression of the pedal 11. Herein, this spring is of the coiled compression type and encircles the rod end 37. One end seats against an abutment 51 on the plug 38 while the other end is made flat as indicated at 52 and adapted to abut against a flange 53 on a bushing 54 which supports the spring end and is backed by a shoulder 55 on the rod enlargement 42. The extended length of the spring 50 is shorter than the spacing of the flange 53 and the abutment 51 so as to provide a small lost motion between the rod 36 and the spring. Accordingly, the force of the spring 50 does not become effective until the piston rod, in response to pressure in the cylinder 33, has moved far enough against the action of the rheostat spring 22 to close the circuit for the electric trailer brakes. Then, as the hydraulic fluid pressure increases, the spring 50 is further compressed along with the progressive actuation of the rheostat 16 so that the energization of both tractor and trailer brakes increases in the desired relation determined by the scale of the spring 50. Since the trailer brake circuit is closed upon the initial movement of the piston rod, and the spring 22 is relatively weak as compared to the spring 50, effective application of the trailer brakes takes place slightly in advance of the tractor brakes, thereby avoiding any possible danger of jackknifing of the vehicles on slippery pavements.

The energization of both brakes decreases progressively as the pedal pressure is reduced permitting reverse movement of the piston rod by the springs 22 and 50. After the spring 50 has become fully extended, the further motion of the piston rod 36 to the brake-released position shown is effected by the rheostat spring 22. During this further motion, the electric brake circuit is broken before the piston rod reaches the abutment 48. In this way, effective deenergization of the trailer brakes is insured.

It will be observed that the amount of lost motion between the rod 36 and the spring 50 and therefore the timing of the energization of the trailer brakes in advance of effective energization of the tractor brakes, may be varied as desired by screwing the plug 38 in or out, thereby shifting the abutment 51. A spring detent 57 engageable in notches 58 spaced around the projecting end of the plug serves to hold the adjustment of the latter.

In pneumatic or vacuum types of tractor brake systems, the movable pressure responsive wall 35 may take the form of a sealed diaphragm and be made substantially larger in diameter.

I claim as my invention:

1. The combination of an elongated rod, a piston on one end of the rod, a cylinder slidably supporting said piston and adapted for connection with a fluid pressure supply line, a guide rigid with and spaced along said rod from said cylinder and guiding the other end of the rod for endwise reciprocation, a switch mechanism supported rigidly with respect to said rod guide and having a rotary actuating shaft extending transversely of and spaced from said rod, an arm fast on said shaft and pivotally connected at its free end to said rod intermediate said cylinder and said guide, a stop limiting the movement of said piston into said cylinder whereby to locate said arm end in a predetermined switch-open position while permitting endwise movement of the rod away from such position in response to an increase of fluid pressure in said cylinder, means yieldably urging the shaft and rod toward such position, said switch mechanism being adapted to close a circuit immediately on movement of said rod away from said position and decreasing the circuit resistance in the continued movement of the rod, and a coiled compression spring encircling said second rod end and having a lost motion connection at one end with said rod whereby to resist continued movement of the rod after the initial movement thereof away from said switch-open position.

2. The combination of an elongated rod guided for endwise movement toward and away from a predetermined switch-open position, a chamber adapted for connection with a fluid pressure supply line and having a wall on one end of said rod for causing movement of the rod away from said position when the pressure in said chamber is increased, a switch mechanism having a rotary actuating shaft extending transversely of and spaced from said rod, an arm fast on said shaft and pivotally connected at its free end to said rod, said switch mechanism being adapted to close a circuit on movement of said rod away from said position and decreasing the circuit resistance in the continued movement of the rod, and a spring having a lost motion connection at one end with said rod whereby to resist continued movement of the rod after the initial movement thereof away from said switch open position.

3. The combination of a chamber adapted for connection with a fluid pressure supply line and having a movable wall, a switch mechanism supported rigidly with respect to said chamber and having an actuating member, an arm fast on said member and connected to said wall, a stop limiting the movement of said member and rod in one direction to a predetermined switch open position while permitting movement of the rod away from said position in response to an increase of fluid pressure in said chamber, said switch mechanism being adapted to close a circuit immediately on movement of said rod away from said position and decreasing the circuit resistance in the continued movement of the rod, and a spring having a lost motion connection with said wall whereby to resist continued movement of the rod after the initial movement thereof away from said switch open position.

4. The combination of a chamber adapted for connection with a fluid pressure supply line and having a movable wall cylinder, a mechanism having an actuating member movable away from a normal predetermined position to close a circuit immediately and then to decrease the resistance of the circuit progressively, a stop limiting the movement of said member in one direction to said predetermined released position, a positive connection between said wall and said member for causing immediate movement of the member away from said position in response to an increase of fluid pressure in said chamber, and spring means having a lost motion connection with said wall whereby to become effective after the initial movement of said member away from said released position and thereafter offer increasing resistance to the movement of the member.

5. The combination of an elongated rod guided for endwise movement, a piston member on one end of the rod, a pressure chamber defined in part by said member and adapted for connection with a fluid pressure supply line, a switch mechanism having a rotary actuating shaft extending transversely of and spaced from said rod, an arm fast on said shaft and pivotally connected at its free end to said rod, means normally locating said rod in a predetermined released position while permitting endwise movement of the rod away from such position in response to an increase of fluid pressure in said chamber, said switch mechanism closing a circuit substantially immediately on movement of said rod away from said position, a normally fixed abutment at the other end of said rod selectively adjustable axially of the rod, and a coiled compression spring encircling said second rod end and acting between said abutment and the rod to resist movement of the rod away from said released position.

6. The combination of a chamber having a wall movable away from a predetermined limit position in response to an increase of pressure in said chamber, spring means normally inactive when said wall is in said position but becoming effective after the initial movement thereof to offer increasing resistance to the wall motion, and a mechanism having its actuating member positively connected to said wall and operable to cause effective closure of an electric circuit immediately upon movement of the wall away from said position and then decrease the circuit resistance progressively in the continued movement of the wall.

7. The combination of a chamber having a wall movable away from a predetermined limit position in response to an increase of pressure in said chamber, spring means normally inactive when said wall is in said position but becoming effective after the initial movement thereof to offer increasing resistance to the wall motion, a voltage regulator connected to said wall and operable to close a circuit in the initial movement of said wall away from said limit position and then increase the energization of said circuit progressively as the pressure in said chamber is increased, and a supplemental spring means acting to return said wall fully to said limit position to insure effective deenergization of said circuit after said first mentioned spring means becomes ineffectual.

FRANK G. BORN.

REFERENCES CITED

The following references are of record in the file of this patent:

UNITED STATES PATENTS

| Number | Name | Date |
| --- | --- | --- |
| 977,079 | Dunbar | Nov. 29, 1910 |
| 2,260,641 | Reid | Oct. 28, 1941 |
| 2,384,618 | Hebeler | Sept. 11, 1945 |